US011159835B1

(12) United States Patent
Chud et al.

(10) Patent No.: US 11,159,835 B1
(45) Date of Patent: Oct. 26, 2021

(54) SHADOW IMPRESSIONS FOR STORAGE AND DELIVERY OF STREAMING VIDEO

(71) Applicant: Amazon Technologies, Inc., Seattle, WA (US)

(72) Inventors: Andrew Christopher Chud, Austin, TX (US); Eric Gober, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 16/215,304

(22) Filed: Dec. 10, 2018

(51) Int. Cl.
*H04N 21/231* (2011.01)
*H04N 21/24* (2011.01)
*H04N 21/262* (2011.01)
*H04N 21/81* (2011.01)
*H04N 21/858* (2011.01)

(52) U.S. Cl.
CPC ... *H04N 21/2407* (2013.01); *H04N 21/23106* (2013.01); *H04N 21/26266* (2013.01); *H04N 21/812* (2013.01); *H04N 21/8586* (2013.01)

(58) Field of Classification Search
CPC ............. H04N 21/812; H04N 21/4331; H04N 7/17318; H04N 21/2407; H04N 21/4722
See application file for complete search history.

(56) References Cited

U.S. PATENT DOCUMENTS

| 9,361,322 | B1* | 6/2016 | Dutta | G06Q 30/00 |
| 2013/0185164 | A1* | 7/2013 | Pottjegort | G06Q 30/02 |
| | | | | 705/14.73 |

* cited by examiner

*Primary Examiner* — Hsiungfei Peng
(74) *Attorney, Agent, or Firm* — Eversheds Sutherland (US) LLP

(57) ABSTRACT

Devices and methods are provided for using shadow impressions to control storage and delivery of streaming video content. The device may receive a request, the request associated with determining a group of streaming video advertisements for streaming video at a device. The device may determine, based on the request, a first advertisement, wherein the first advertisement is associated with a first number of impressions, wherein the first number of impressions includes a first number of shadow impressions. The device may determine not to include the first advertisement in the group of streaming video advertisements based on the first number of impressions exceeding a first playback threshold. The device may send the group of streaming video advertisements.

20 Claims, 6 Drawing Sheets

US 11,159,835 B1

SHADOW IMPRESSIONS FOR STORAGE AND DELIVERY OF STREAMING VIDEO

BACKGROUND

Video streaming services may provide live streaming video content to devices. During a popular live event, many devices may request video programming from the streaming service. After streaming video services send video programming to devices for playback, the streaming services may determine the next video programming to send. Without knowing whether the previously sent video programming has been played by a device, the streaming service may provide the same video programming twice in a short time, resulting in undesirable repeated playback of video programming and a violation of playback restrictions for video programming.

Figure 1:
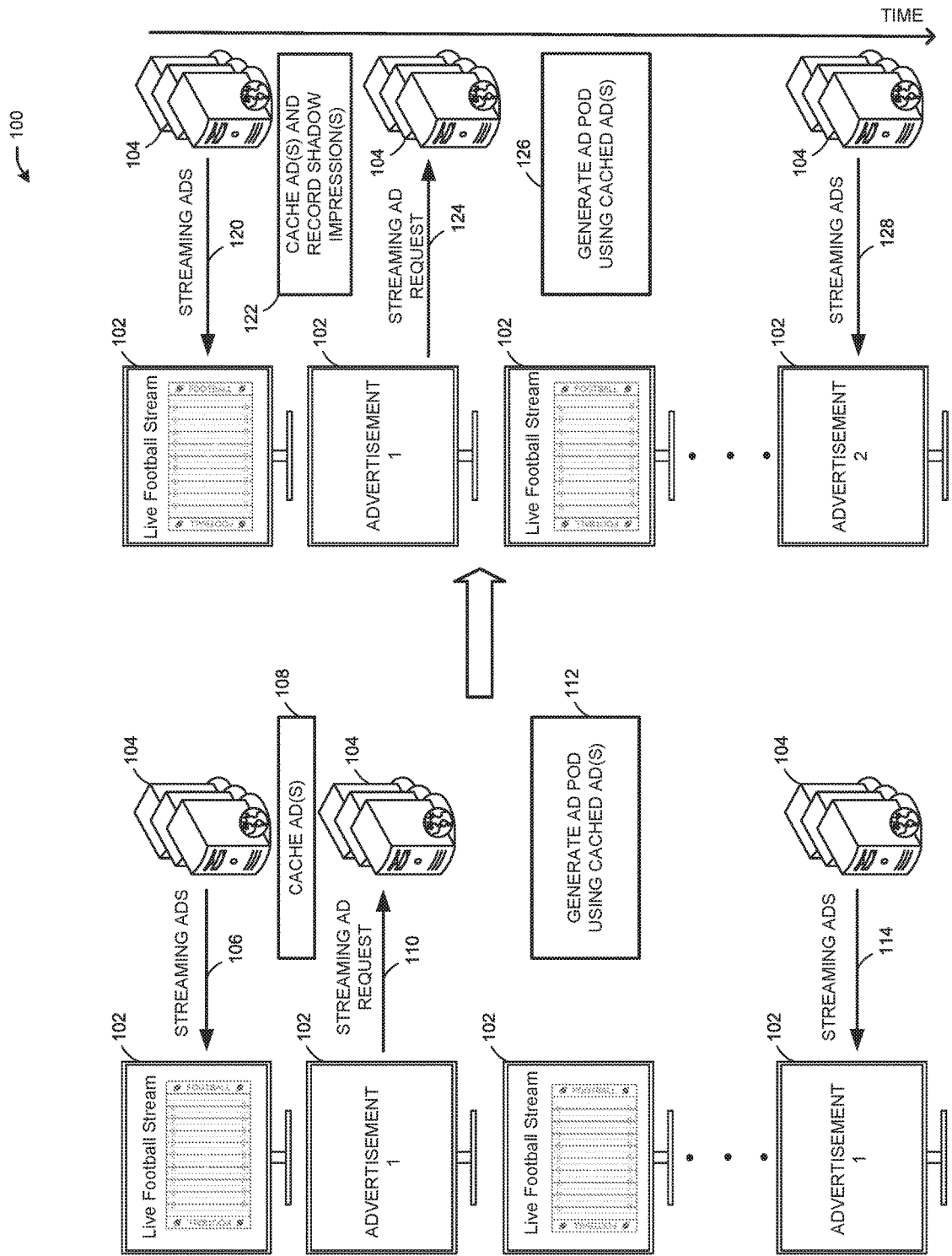
FIG. 1 illustrates an example process of using impressions to deliver streaming video programming, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using shadow impressions for the storage and delivery of streaming video. When providing streaming video programming during live events, streaming video providers may send streaming video programming to devices, including live content and streaming video advertisements. During a high-volume live streaming event, such as a live sporting event, a streaming video provider may receive a high volume of requests for streaming video programming, such as video advertisements, during a commercial break of the live video programming. The streaming video provider may rely on impressions indicated by the devices to determine when video programming has been presented by the devices. When a high volume of content requests and impressions are received by the streaming video service, a race condition may occur in which video programming is sent to one or more devices while another set of video programming is retrieved and cached for fast retrieval in response to a subsequent request for additional video programming. When retrieving the next set of video programming, the impression data may not yet be available to determine the availability of video programming without violating playback restrictions. Thus, there is a need for streaming video providers to be able to determine in high-volume content request situations when streaming video programming may be provided to devices.

A streaming video provider, such as a video advertising service, may pre-fetch a group of streaming video advertisements to be provided upon request from streaming devices to ensure that the streaming video advertisements are presented by the devices during a commercial break from a live-streamed program provided by a streaming video content service (e.g., a system which provides video content to the devices for playback). However, the streaming video provider may retrieve and store a new group of streaming video advertisements to be available in response to the next request for advertisements before receiving an impression associated with a previously provided advertisement (e.g., an indication that a previous streaming video advertisement has been played by a device during a commercial break). The streaming video provider may retrieve video advertisements cached in response to a request for an advertisement pod (e.g., a multi-advertisement commercial break during live streaming video). The pre-fetch signal may be received before the video streaming provider may determine that the advertisements in a previously sent advertisement pod have been played (e.g., before receipt of an impression event). In this manner, a device's ability to respond to a request for video (e.g., video advertisements) may be improved by pre-fetching and caching the video so that the video is available to be provided quickly in response to a request.

Because a pre-fetch request may occur before impression events are received indicating that previously sent streaming video advertisements were played, the streaming video provider may not be able to account for the impressions when generating the next advertisement pod. As a result, the streaming video provider may over-serve advertisements, which may violate rules for budgeting and frequency capping, among others, associated with an advertisement or advertisement campaign. Therefore, the determination of video programming to provide to devices may depend on a computer's ability to determine at a given time whether particular video programming, such as a video advertisement, is available to play, given playback limits set for the video programming. As a streaming video provider serves an advertisement pod to a client device, at the same time, the streaming video provider pre-fetches a next set of advertisements. When the pre-fetch operation occurs, the client device may not have reported yet that the previous set of advertisements in the advertisement pod were shown. Because showing a first pod and pre-fetching for a second pod may occur at the same time, the streaming video provider may not account for which advertisements were shown in a first pod when selecting advertisements for a second pod.

In some streaming video provider systems, impression events may be used to indicate that advertisements were presented, to record an impact on an advertisement campaign budget, to monitor and maintain a specified frequency at which advertisements should be played, and to record how much revenue is owed by advertisers to the video streaming service provider. Impression events may refer to an advertisement view, which may be indicated by a media file which includes when an advertisement began playing, when it reaches partial completion, when it reaches full completion, etc. The media file may be associated with a uniform resource locator (URL) which, when selected, causes the media file to load. The number of impressions of a video advertisement may be determined by the number of times the file associated with the advertisement is loaded. For example, an ad impression may be counted when an ad counter receives and responds to an HTTP request for a tracking asset from a client device. The count may occur after retrieval of associated page content. Impression data received from multiple devices may indicate the number of devices on which a particular advertisement has been presented. Advertisement reports may list the number of times that an advertisement was served. Advertisement impressions may be logged by a server, which may save the numbers for advertisement reports. The number of impressions that an advertisement has may indicate whether an advertising campaign is working. For example, a campaign that is working may have both a large number of impressions and a high conversion rate.

Streaming video advertisements may use the video ad serving template (VAST) standard, which is defined by a technical standard generated by the Interact Advertising Bureau. The VAST technical standard defines communications between advertisement servers (e.g., servers used to store and provide video content and to monitor impressions) and video players (e.g., players embedded into a website or mobile application and used to display video content). To play a streaming video advertisement, a client device may send a request to a VAST advertisement server (e.g., in the form of a URL). The VAST advertisement server may respond to the request by providing streaming video content to be played by the client device, how the content should be played, and which playback information to track as the content is played. For example, the VAST standard may ensure that streaming video content is played by video players without concern about streaming video not being formatted properly for playback. A video player may indicate tracking metrics to a VAST advertisement server, such as whether content has been played, play rate, viewability, drop-off rate, dwell rate, etc.

When a streaming video provider sends an advertisement pod with multiple streaming video advertisements and then receives a subsequent request for the next advertisement pod, the streaming video provider may not receive and/or process an indication from a video player whether the streaming video advertisements in the previously presented advertisement pod have been played. The streaming video provider may use cached video advertisements to generate a new advertisement pod, but without knowing whether content was recently played, the same content may be provided in an advertisement pod. To better control the caching and delivery of video advertisements, the streaming video provider may use a "shadow" impression. A device's ability to quickly respond to a request for video (e.g., video advertisements) may be improved while also accounting for the device's ability to determine accurately whether video is available to be provided in response to a request for video.

In such a manner, a device's ability to quickly respond to a request for video advertisements without violating playback and budget restrictions for the video advertisements may be improved.

In one or more embodiments, a shadow impression may be used to enhance the storage and delivery of streaming video programming such as streaming video advertisements. When an advertisement request is received by a streaming video advertisement service (e.g., an advertisement exchange) for a pre-fetch signal for cached advertisements, the streaming video advertisement service may inject a shadow impression. A shadow impression may function like a regular impression with respect to tracking campaign budgets and frequency capping, but unlike a regular impression, a shadow impression may expire after a time period. For example, a time-to-live (TTL) time period may be used as an expiration time for a shadow impression. During the time period, a video streaming or advertisement system may consider an advertisement as having been presented for the purposes of tracking an advertising budget and/or frequency (e.g., the shadow impression may indicate temporarily that the advertisement has been presented). If an actual impression for an advertisement is received before expiration of the time period, the shadow impression may be expunged (e.g., deleted/removed) and/or replaced with the actual impression. If an actual impression for the advertisement is not received before expiration of the time period, the shadow impression may be expunged. In such a manner, the shadow impression may affect the counted number of times an advertisement has been played over a given time even if a computer has not yet processed an actual impression confirming the playback.

In one or more embodiments, when an advertisement is used in an advertisement pod, the advertisement may be assigned a shadow impression having an expiration time indicating that the advertisement is not available until the expiration of that time unless an actual impression is received and indicates that the advertisement was played. Also unlike actual impressions, shadow impressions are not counted in calculating advertisement revenue for a campaign. Shadow impression events may allow an advertisement caching system to handle a high burst rate of traffic, such as during a live streaming event with many viewers, while facilitating control of campaign budgets and frequency capping. In this manner, a viewer may not see the same advertisement too many times, and a streaming video advertisement service may not have to cache and provide the same advertisements when those advertisements should not be played during a given time. Thus, the use of shadow impressions in streaming video may enhance both a viewer's experience and the ability of a computer to track the playback of streaming video content during situations when the computer otherwise may be unable to determine whether content has been played before the same content may be played again.

Streaming video advertisements may be provided and played in different ways. One example may include server-side advertisement stitching. Another example may include client-side injection of advertisements. Server-side ad stitching may refer to publishers stitching video and advertisement content together before providing the content and advertisements for web browser playback. Client-side advertisements may refer to client devices receiving video content and advertisements and combining them for playback. In one more embodiments, enhancements provided by shadow impressions may work with both types of streaming video by including the shadow impression data with any advertisement so that the proper playback metrics are tracked.

In one or more embodiments, if a streaming video advertisement service receives impression data indicating that a streaming video advertisement has been played, the streaming video advertisement service may use that data to determine whether or when to again provide the streaming video advertisement. The impression data may be received and processed before expiration of the time associated with a shadow impression, in which case the shadow impression may expire. If the shadow impression time (e.g., time-to-live) expires before receipt of an impression indication that the streaming video advertisement was played, the shadow impression may expire. Before expiration of the shadow impression time, the streaming video advertisement service may assume that the streaming video advertisement has been played and may be unavailable during that time for subsequent playback at a given device (e.g., if the shadow impression results in a determination that the advertisement has been played enough times when compared to a frequency cap or advertisement budget). Once the shadow impression time has expired, if an actual impression has not been processed indicating that the streaming video advertisement was played, the streaming video advertisement service may determine that the streaming video advertisement was not played, which may indicate that the streaming video advertisement is again available for a subsequent advertisement pod.

In one or more embodiments, while a streaming video advertisement may have a URL associated with an actual impression, during the shadow impression time the streaming video advertisement also may have a URL associated with the shadow impression. Therefore, two files/pages may be associated with the use of the streaming video advertisement before the shadow impression time expires. A streaming video advertisement service may use either the URL of the actual impression or the URL of the shadow impression to determine whether a streaming video advertisement has been played. The URL of the actual impression may have a different endpoint than the URL of the shadow impression.

In one or more embodiments, the streaming video advertisement service may be able to differentiate between the actual impression URL and the shadow impression URL, thereby allowing the streaming video advertisement service to determine at a given time when the streaming video advertisement was last played, while also using such information to determine the impact on budgeting and playback frequency for the streaming video advertisement. In particular, the streaming video advertisement service may use the actual impression URL to determine that the streaming video advertisement was played and the subsequent impact on budget and frequency, and the streaming video advertisement service may use the shadow impression URL to determine that the streaming video advertisement was played without using the data to account for billing and frequency. After expiration of a shadow impression time, the shadow impression may expire (e.g., be deleted/removed). Expired shadow impressions may be removed/expunged at any given time, or may be replaced by other shadow impressions.

In one or more embodiments, the shadow expiration time may be set by a streaming video advertisement service or received from a broadcaster. Time-to-live (TTL) may refer to a time limit of a computer resource, and may be implemented as a timestamp or counter. The TTL may be included with (e.g., embedded in) or in addition to streaming video data. For example, TTL may be included in a header of a frame including the video data. The TTL or other expiration time may be determined based on the broadcast type (e.g., the type of content, the type of devices used to play the content, etc.). A shadow event may include the TTL, which advertisement was played, which campaign is associated with an advertisement, the cost of the advertisement and/or campaign, and other relevant metrics.

In one or more embodiments, streaming video advertisements may be cached and stored based on the individual devices used for playback (e.g., client devices). For example, advertisements for different devices may be stored in the same cache or in different caches, but the groups of advertisements (e.g., advertisement pods) may be device-specific. The streaming video advertisement service may determine which streaming video advertisements have been played by which devices, and may generate advertisement pods based on which advertisements are available for playback at a given time for a particular device based on budget, frequency, and other relevant campaign data associated with impressions.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 of using impressions to deliver streaming video programming, in accordance with one or more example embodiments of the present disclosure.

Referring to FIG. 1, the process 100 may include a device 102 streaming video, such as a live football game. A streaming video provider 104 (e.g., an advertisement service) may provide streaming video advertisements at step 106 to the device 102 to be played during a commercial break during the live streaming program (e.g., advertisement 1 may be played during a commercial break). At step 108, the streaming video provider 104 may fetch and cache one or more streaming video advertisements to provide at a subsequent commercial break. Step 108 may refer to a pre-fetching, and may occur at the same time or right after step 106, so the streaming video provider 104 may not have received impression data indicating whether advertisement 1 was played, for example. At step 110, the device 102 may send a streaming ad request to the streaming video provider 104 indicating a request to provide additional streaming video advertisements for the next commercial break. At step 112, the streaming video provider 104 may generate a next group of advertisements to send to the device 102 for a future commercial break. Without having received an actual impression indicating that the advertisement 1 was played, the streaming video provider 104 may determine that the advertisement 1 may be eligible due to not having reached a playback limit/threshold, so the advertisement 1 may be included in the advertisements generated at step 112. At step 114, the streaming video provider 104 may send the group of advertisements to the device 102, including the advertisement 1.

Still referring to FIG. 1, the use of shadow impressions may enhance the process 100. At step 120, the streaming video provider 104 may send streaming ads to the device 102 for a commercial breaking during a live stream. At step 122, the streaming video provider 104 may pre-fetch (e.g., retrieve and cache) one or more advertisements and record respective shadow impressions associated with an advertisement. A shadow impression may indicate to the streaming video provider 104 that an advertisement has been cached and is likely to be played in an advertisement pod for a temporary time period. Using actual and shadow impression data, the streaming video provider 104 may determine whether including an advertisement, such as the advertisement 1, in an advertisement pod will violate playback limits on the advertisement, such as frequency and budget limits. If the streaming video provider 104 determines that the advertisement 1 is ineligible due to a playback limit, the streaming video provider 104 may determine to not include the advertisement 1 in the cache for a next pod. At step 124, the device 102 may send a streaming advertisement request to the streaming video provider 104. Accounting for the shadow impression, the streaming video provider 104 may send advertisements in a pod for a future commercial break, excluding the advertisement 1 and including a different advertisement (e.g., advertisement 2) which was not previously provided at step 120.

In one or more embodiments, a shadow impression may indicate for a temporary/limited time that an advertisement was cached and likely played. In this manner, a shadow impression may act like an actual impression in some ways while not affecting some determinations which consider impression events. For example, publishers and advertisers may receive data from the streaming video provider 104 to make billing calculations. Shadow impressions may not affect such data because, for example, shadow impressions do not confirm whether an advertisement was actually played. Instead, shadow impressions may indicate to the streaming video provider 104 during a limited time that an advertisement which was cached and/or served was played even when an actual impression has not been provided to confirm playback of the advertisement. When determining how many times or how often a streaming video advertisement has been played, the streaming video provider 104 may count shadow impressions. In this manner, a shadow impression may indicate to the streaming video provider 104 for a limited time period after caching and/or serving the advertisement that the advertisement likely was played, allowing the streaming video provider 104 to count the likely playback when considering whether an advertisement is eligible for a subsequent advertisement pod.

In one or more embodiments, while a streaming video advertisement may have a URL associated with an actual impression, during the shadow impression time the streaming video advertisement also may have a URL associated with the shadow impression. Therefore, two files/pages may be associated with the use of the streaming video advertisement before the shadow impression time expires. The streaming video provider 104 may be able to differentiate between the actual impression URL and the shadow impression URL, so the streaming video provider 104 may determine when the streaming video advertisement was last played. After expiration of a shadow impression time, the shadow impression may expire (e.g., be deleted/removed). Expired shadow impressions may be removed/expunged at any given time, or may be replaced by other shadow impressions. If a shadow impression expires before the streaming video provider 104 processes an actual impression indicating that an advertisement was played, the expunging of the shadow impression may result in the record indicating that the advertisement was recently cached (e.g., likely played) being removed (e.g., if the playback count of an advertisement is 1 based on the shadow impression, the count may decrement to 0). If an actual impression is received for an advertisement before expiration of the shadow impression (e.g., expiration of the time associated with the shadow impression), the playback count of the advertisement may remain the same, and the shadow impression may be expunged.

In one or more embodiments, a shadow impression may function like a regular/actual impression with respect to tracking campaign budgets and frequency capping, but unlike a regular/actual impression, a shadow impression may expire after a time period. The expiration time for a shadow impression may be associated with a TTL or some other time either set by the streaming video provider 104 or determined by the streaming video provider 104 based on an instruction from a broadcaster or other content provider. The expiration time also may be set using machine learning based on historical performance and use data for advertisements.

Figure 2:
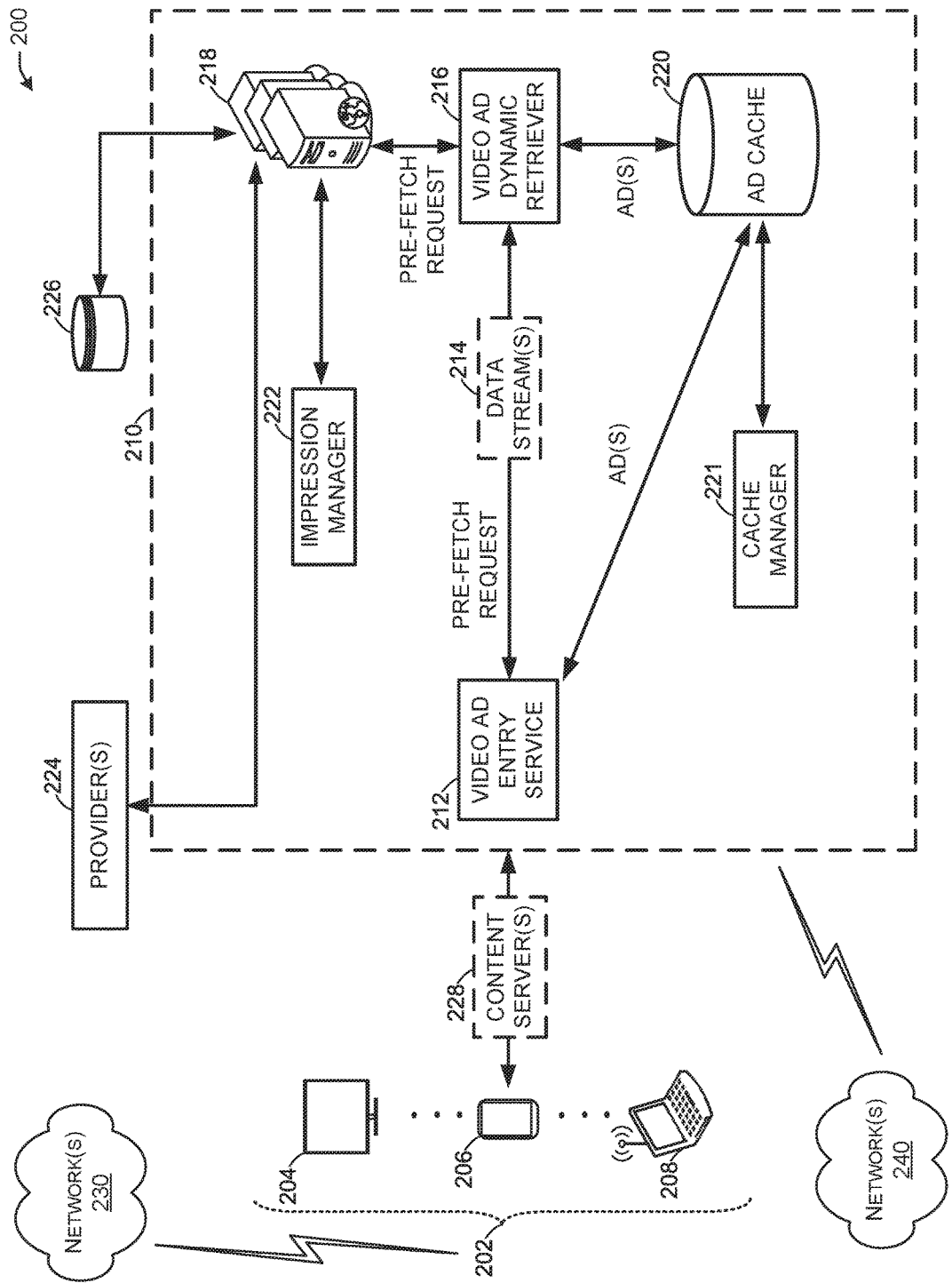
FIG. 2 illustrates a system for storing and delivering streaming video programming, in accordance with one or more example embodiments of the present disclosure.

FIG. 2 illustrates a system 200 system for storing and delivering streaming video programming, in accordance with one or more example embodiments of the present disclosure.

Referring to FIG. 2, the system 200 may include user devices 202 (e.g., user device 204, user device 206, user device 208, etc.), which may refer to devices which receive and present streaming video content (e.g., device 102 in FIG. 1). The user devices 202 may communicate with a streaming video provider 210 (e.g., a video advertisement service). For example, the user devices 202 may make service calls and send ad requests and impressions to the streaming video provider 210. The streaming video provider 210 may include a video advertisement entry service 212, data streams 214, a video advertisement dynamic retriever 216, an advertisement exchange 218, an advertisement cache 220, a cache manager 221, an impression manager 222, one or more providers 224 (e.g., advertisers, content publishers, etc.) one or more databases 226, and one or more content servers 228.

Still referring to FIG. 2, the user devices 202 may call and request advertisements from the video advertisement entry service 212, including providing indications of types of advertisements requested, advertisement duration, and other relevant information for the streaming video provider 210 to determine which advertisements to provide. The video advertisement entry service 212 may generate and send a pre-fetch request signal to the video advertisement dynamic retriever 216, and the data streams 214 may serve as a queue for the pre-fetch requests. When the video advertisement dynamic retriever 216 identifies a pre-fetch request, the video advertisement dynamic retriever 216 may generate a retriever function which indicates to the advertisement exchange 218 a request to fetch and cache video advertisements. The advertisement exchange 218 retrieves advertisements, and the video advertisement dynamic retriever stores eligible advertisements in the advertisement cache 220. The video advertisement entry service 212 may determine an advertisement pod using the advertisements in the advertisement cache 220 by optimizing the advertisement selection based on information provided in an advertisement request. The streaming video provider 210 may provide advertising pods to the user devices 202.

Streaming video advertisements may be provided and played in different ways. One example may include server-side advertisement stitching. In server-side advertisement stitching, the one or more content servers 228 may stitch video and advertisement content together before providing the content and advertisements to the user devices 202. Client-side advertisements may refer to the user devices 202 receiving video content and advertisements from the streaming video provider 210 and combining them for playback.

In one or more embodiments, the streaming video provider 210 may determine which advertisements may be eligible for an advertisement pod. Using impression events, the streaming video provider 210 may determine whether an advertisement has reached a playback limit/threshold associated with a playback frequency, budget, or other limits. The streaming video provider 210 may determine, based on impression events received from the user devices 202, when an advertisement was played by a device. If an advertisement was provided to a user device (e.g., user device 204), and a request for subsequent advertisements is processed by the streaming video provider 210 before an actual impression for the advertisement is received from the user device and processed by the streaming video provider 210, the streaming video provider 210 may not be able to consider a likelihood that the advertisement recently was played by the user device, and may not account for that likely playback in generating another advertisement pod. Using a shadow impression, however, the streaming video provider 210 may count the likely recent playback when determining whether the advertisement is eligible to be provided to the user device in a subsequent advertisement pod. Playback limits such as frequency and budget caps may be determined by the streaming video provider 210 or set by other parties, such as the one or more providers 224. The advertisement exchange 218 may receive playback limit data from the one or more providers 224 and/or from the one or more databases 226, which may store playback limit data.

In one or more embodiments, when an advertisement is cached in the advertisement cache 220, the streaming video provider 210 may include a cache entry with the respective expiration time for a recorded shadow impression. The shadow impression of a cache entry may indicate that the advertisement was cached and is likely to be played because the advertisement is selected for a pod from the advertisement cache 220. When the expiration time for an advertisement expires, the streaming video provider 210 may expunge the shadow impression. The cache manager 221 may be a component of the advertisement cache 220 or may be separate from the advertisement cache 220, and may be responsible for managing cache entries and expunging expired entries from the advertisement cache 220. The advertisement exchange 218 may process pre-fetch requests directly, as the advertisement exchange 218 may not be aware of the caching of advertisements in the advertisement cache 220. A shadow impression may indicate to the advertisement exchange 218 that an advertisement was cached and likely played even though the advertisement exchange 218 may not access or have visibility of the advertisement cache 220. In this manner, the advertisement exchange 218 may be aware of the impressions associated with an advertisement, and may account for the impression data when retrieving advertisements to be included in a pod.

In one or more embodiments, the advertisement exchange 218 may be able to differentiate between the actual impression URL and the shadow impression URL, so the advertisement exchange 218 may determine if/when the streaming video advertisement was last played. When processing an advertisement request, the streaming video provider 210 may consider the number of times an advertisement has played over a given time by evaluating impression data (e.g., actual impressions) provided by the user devices 202 and shadow impression data recorded internally. If a shadow impression expires before the streaming video provider 210 processes an actual impression indicating that an advertisement was played, a count indicating how many times the advertisement was played may be deleted (e.g., decremented). If an actual impression is received for an advertisement before expiration of the shadow impression (e.g., expiration of the time associated with the shadow impression), the playback count of the advertisement may remain the same, and the shadow impression may be removed. In this manner, operations of the streaming video provider 210 may be improved by allowing the streaming video provider 210 to determine eligibility of an advertisement at any given time even when an advertisement was just served and no impression data has yet been received indicating that the advertisement was played.

In one or more embodiments, the impression manager 222 may be responsible for providing impression data, expunging or replacing impressions, and other impression data functions. For example, when an advertisement is considered for a pod, the impression manager 222 may analyze impressions and provide impression data to the advertisement exchange 218 to indicate whether an advertisement is available. The advertisement exchange 218 may select advertisements for a pod based on whether a given advertisement is available. To determine advertisement availability and whether to include an advertisement in a pod, the advertisement exchange 218 may determine the actual and shadow impressions based on impression data generated and provided by the impression manager 222, and may determine at a given time whether the total number of impressions including actual and shadow impressions exceed a playback threshold (e.g., a frequency cap and/or budget limit). The impression manager 222 may include computer processors, memory, software, firmware, and/or multiple devices.

Any of the user device(s) 202 (e.g., user devices 204, 206, 208), and the streaming video provider 210 may be configured to communicate with each other via one or more communications networks 230 and/or 240 wirelessly or wired. Any of the communications networks 230 and/or 240 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 230 and/or 240 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 230 and/or 240 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
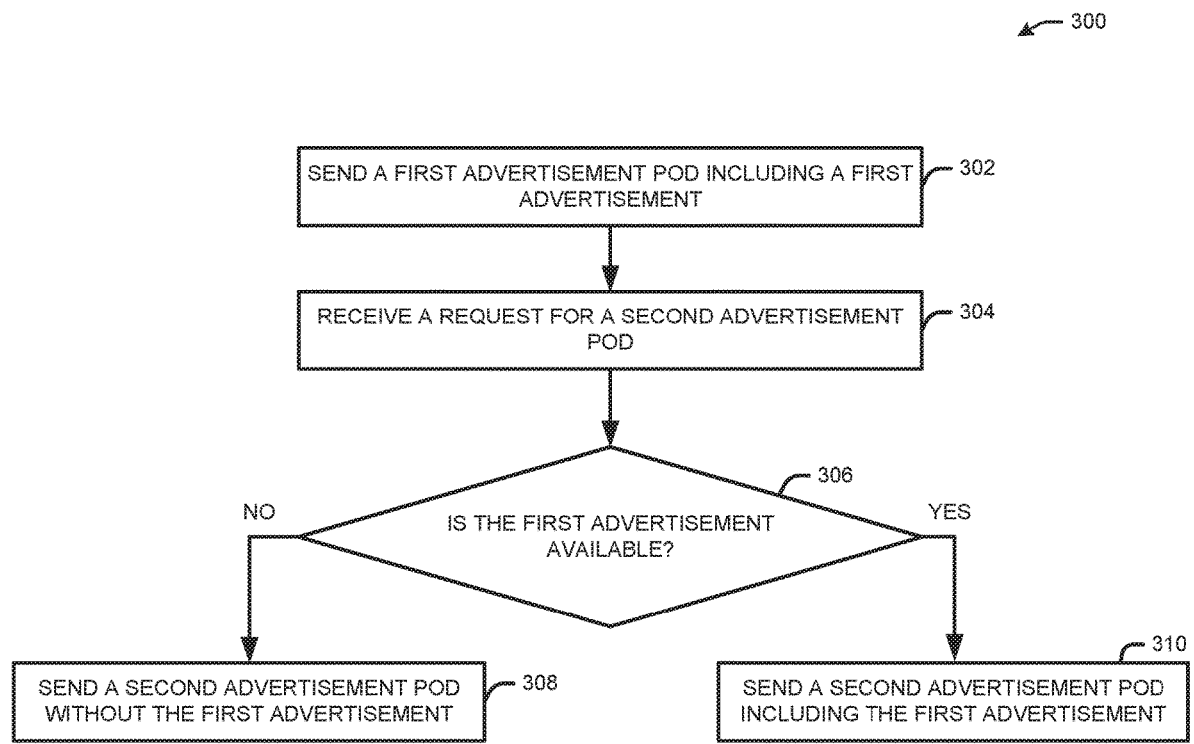
FIG. 3 illustrates a flow diagram for a process for storing and delivering streaming video programming, in accordance with one or more example embodiments of the present disclosure.

FIG. 3 illustrates a flow diagram for a process 300 for storing and delivering streaming video programming, in accordance with one or more example embodiments of the present disclosure.

Referring to FIG. 3, a device (e.g., the streaming video provider 210 of FIG. 2) may send a first advertisement pod including a first advertisement to one or more devices (e.g., user devices 202 of FIG. 2). The advertisement pod may be determined based on a request received from the one or more devices, and the request may be associated with an upcoming advertisement break during a live-streaming program. The request may indicate when the advertisement pod is needed, what the live programming is, what type of advertisement to provide, what type of device is requesting the pod, the length of the commercial break, and other relevant information for determining which advertisements to include in a pod. The device may send the advertisement pod with advertisements to be presented by the one or more devices during the commercial break. The advertisement pod may be generated before a commercial break, and the advertisements selected for the pod may be determined based on impression data.

At block 304, the device may receive a request for another advertisement pod. The request may be received before an impression for an advertisement in a previous pod has been received and processed by the device. After sending the first advertisement pod at block 302, the device may pre-fetch and cache one or more advertisements for a next pod. The device may receive the request from one or more user devices and may use the advertisements stored in a cache (e.g., the advertisement cache 220 of FIG. 2) in the next pod. In a high-volume context when many user devices may be streaming a live program, the device may receive many requests for advertisement pods. The device may also receive actual impression data from user devices indicating that advertisements were presented by the user devices. Due to a high volume of impression data and advertisement requests being received, however, the device may not receive impression data for previously sent advertisements before having to generate another pod based on which advertisements are available for the pod.

At block 306, the device may determine whether an advertisement (e.g., the first advertisement in block 302) is available/eligible for the next pod. The device may rely on impression data received from the devices requesting the pod. Because the device may not have received and processed actual impression data for the first advertisement, the device may not be able to account for whether the first advertisement was played recently without using a shadow impression. For example, if the advertisements in the pod sent at block 302 are assigned shadow impressions for a limited time when they are retrieved and cached for use in the pod, the device may determine that the advertisements in the pod sent at block 302 have been cached/played recently based on the shadow impression, which may indicate for a limited/temporary time the caching/playback of an advertisement. If the device pre-fetches advertisements for an advertisement pod before the expiration of the time associated with a shadow impression of an advertisement, the device may count the previously sent advertisement as having been cached/played based on the indication of such caching/playback provided by the shadow impression. If the device receives an actual impression for the first advertisement before expiration of the time associated with the shadow impression for the first advertisement, the device may expunge the shadow impression and count the actual impression. If the device determines that the first advertisement is not available because, for example, actual or shadow impression data affects a frequency cap or budget limit for the first advertisement, the device may proceed to block 308. If the device determines that the first advertisement is available for a next pod, the device may proceed to block 310. The determination of whether the first advertisement is available may occur before receiving the request at block 304, in which case the device may respond to the request at block 308 or block 310 based on the availability of the first advertisement.

At block 308, the device may determine and send a second advertisement pod to a requesting device, and the pod may exclude the first advertisement. If the device determines at block 306 that the first advertisement has been played too many times, too frequently, or has exceeded a budget limitation, the device may refrain from including the first advertisement in the next pod. If shadow or actual impression data does not result in a determination that the first advertisement has exceeded a playback limit/threshold associated with a frequency cap, budget limit, or other limit, the device may determine and send an advertisement pod which includes the first advertisement at block 310. Even if the first advertisement is determined to be available at block 306, the first advertisement may not be included in the next pod. There may be a sufficient number of available advertisements meeting requested criteria for the next advertisement pod, and the first advertisement may not be selected each time that it is available. The first advertisement may be included in subsequent pods depending on whether the device determines at block 306 at any given time if the first advertisement is available for delivery to a particular device. Eligibility for delivery may depend on the use and spend associated with an advertisement at any particular device and/or across multiple devices.

Figure 4:
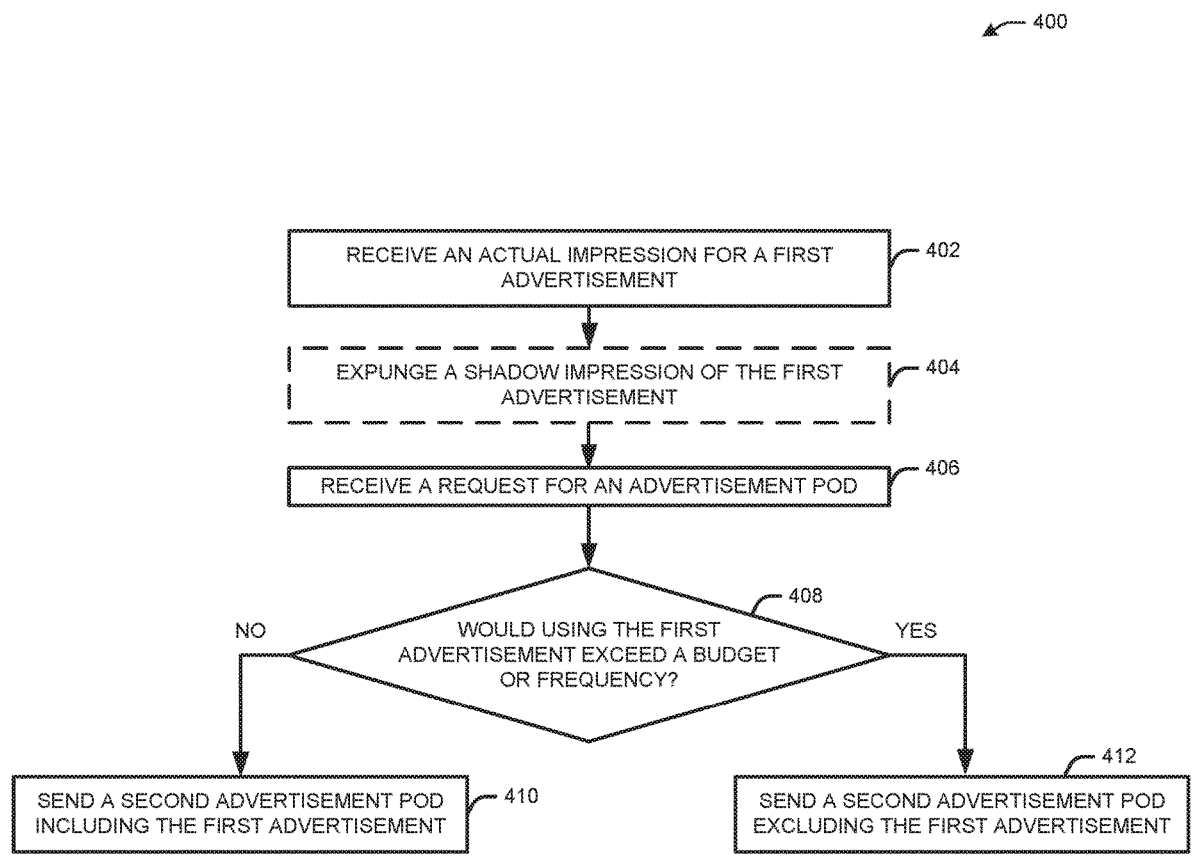
FIG. 4 illustrates a flow diagram for a process for storing and delivering streaming video programming, in accordance with one or more example embodiments of the present disclosure.

FIG. 4 illustrates a flow diagram for a process 400 for storing and delivering streaming video programming, in accordance with one or more example embodiments of the present disclosure.

At block 402, a device (e.g., the streaming video provider 210 of FIG. 2) may receive an actual impression for a first advertisement. The actual impression may be received from a user device (e.g., user devices 202 of FIG. 2) and may indicate that a user device played a first advertisement. The actual impression may refer to an advertisement view, which may be indicated by a media file which includes when an advertisement began playing, when it reaches partial completion, when it reaches full completion, etc. The media file may be associated with a URL which, when selected, causes the media file to load. The number of impressions of a video advertisement may be determined by the number of times the file associated with the advertisement is loaded.

At block 404, the device optionally may expunge a shadow impression of the first advertisement whose impression was received at block 402. For example, if the first advertisement was sent to a user device in a previous pod during live-streamed programming with a large number of user devices viewing the programming, the device may have used a shadow impression for the first advertisement to indicate that the advertisement was cached/played. A count of how many times the first advertisement was cached/played within a given time may increase to account for the likelihood that the advertisement was played after the device sent the advertisement in a pod. The shadow impression may include a URL similar to a URL for an actual impression, and the URL may refer to a page which indicates the playback of the first advertisement. The shadow impression may be temporary. For example, a TTL may be associated with the temporary existence of the shadow impression, and the TTL may begin to count down in time once an advertisement has been cached for a pod or sent in a pod. When the TTL expires, the shadow impression may be expunged and the playback count for the first advertisement updated to no longer reflect the playback indicated by the shadow impression (e.g., expiration of the TTL may indicate that the first advertisement was not played within the TTL time). When the device receives an actual impression at block 402 before expiration of the TTL, however, the actual impression may confirm playback of the first advertisement within the TTL time. Rather than counting playback of the first advertisement twice, the device may expunge the shadow impression and replace it with the actual impression, so the count may be unaffected.

At block 406, the device may receive a request for an advertisement pod. The device may receive the request from one or more user devices. In a high-volume context when many user devices may be streaming a live program, the device may receive many requests for advertisement pods. In anticipation of the request, the device may have retrieved and cached one or more advertisements to send in a pod. The advertisements may have a record indicating a shadow impression with an expiration time. Because the advertisements may have been served previously by the device, but the device may not have received actual impression data indicating playback of the advertisements, the device may rely on shadow impressions when determining which advertisements to cache for a pod.

At block 408, the device may determine whether the first advertisement is available for a next advertisement pod. The determination may include determining whether using the first advertisement in a next pod would exceed a frequency cap or budget limit. For example, the actual impression may indicate that the first advertisement was recently played (e.g., within the duration of the TTL). The first advertisement may be subject to frequency limitations (e.g., play once per hour, twice per day, etc.). The first advertisement may be subject to budget limits (e.g., a campaign budget). If the device determines that providing the first advertisement at a requested time in an advertisement pod would not exceed a playback limitation such as a budget or frequency limit, the device may proceed to block 410. If the device determines that providing the first advertisement at a requested time in an advertisement pod would exceed a playback limitation such as a budget or frequency limit, the device may proceed to block 412. The determination of availability of the first advertisement may occur before receiving the request at block 406, in which case the device may respond to the request at block 410 or block 412 based on the availability of the first advertisement.

At block 410, the device may determine and send an advertising pod including the first advertisement. The advertising pod may be cached before receiving the request at block 406, and the cached advertisements made available for a pod in response to the request at block 406 may have respective shadow impressions. The determination of whether an advertisement is available at block 408 may depend on both actual and shadow impressions. For example, if at block 408 the device determines that including the first advertisement in the pod would not result in exceeding a playback limitation for the first advertisement, the first advertisement may be included in the pod. If the first advertisement is cached and included in the pod, then a shadow impression may be assigned to the first advertisement with an expiration time indicating that, before expiration of the expiration time (e.g., TTL), the first advertisement may be considered as having been cached/likely presented by a user device. The shadow impression may increase a playback count associated with how often the first advertisement has been played over a period of time. Even if the device determines at block 408 that the first advertisement is eligible for a pod, the device may not include the first advertisement in the next pod because there may be other eligible advertisements and/or the first advertisement may not meet the criteria indicated by a received request for an advertisement pod.

At block 412, the device may determine and send an advertising pod excluding the first advertisement. For example, if at block 408 the device determines that including the first advertisement in the pod would result in exceeding a playback limitation for the first advertisement, the first advertisement may be excluded from the pod. The advertisement pod may be generated and sent using advertisements fetched and cached according to the request provided by a user device for the advertisement pod. The advertisements included in the pod may be assigned respective shadow impressions used to count the included advertisements as played until expiration of an associated expiration time (e.g., TTL).

Figure 5:
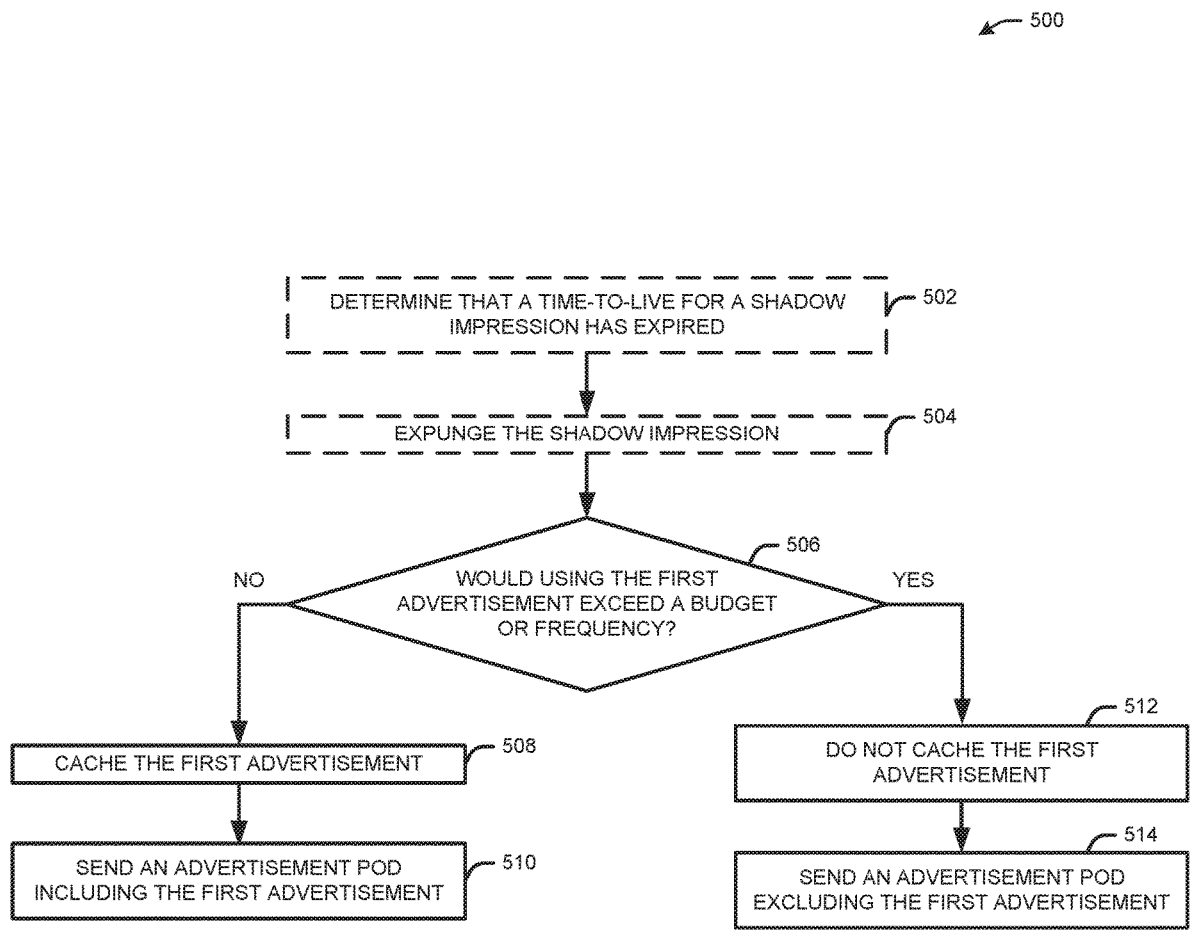
FIG. 5 illustrates a flow diagram for a process for storing and delivering streaming video programming, in accordance with one or more example embodiments of the present disclosure.

FIG. 5 illustrates a flow diagram for a process 500 for storing and delivering streaming video programming, in accordance with one or more example embodiments of the present disclosure.

At block 502, a device (e.g., the streaming video provider 210 of FIG. 2) may determine that no actual impressions indicating that a first advertisement was played were received and processed before the expiration of a TTL for a shadow impression of the first advertisement, and may determine that the TTL has expired. If an actual impression is received and processed before expiration of the expiration time, the device may determine that the content associated with the shadow impression was played, and may update playback metrics accordingly. If no actual impression is received for an advertisement when the TTL expires, the device may determine that the advertisement was not played during the TTL time. The TTL may be determined by the device or provided to the device by another device (e.g., a broadcaster may set the TTL). The TTL may be based on a broadcast type. For example, commercial breaks may occur at different times for different broadcast types. A television show may set commercial breaks at certain times for thirty and sixty minute programs, while a live event such as a live sports program may have less predictable commercial break times. The TTL may be set to account for enough time to ensure that once an advertisement has been sent in an advertisement pod, the advertisement will likely not be sent in the next advertisement pod. If commercial breaks are expected every ten minutes, for example, then the TTL for a shadow impression may be set for at least that time period to count an advertisement as recently played for at least that time period so that the decision whether to include the advertisement in another pod accounts for the likelihood that the advertisement was recently played/viewed. For less predictable commercial breaks, the TTL may be set at a sufficiently long time which is likely to span from one commercial break through at least one other commercial break. If the TTL is not provided to the device, the device may set a TTL based on a broadcast type, and may use machine learning such as artificial intelligence or machine learning to identify likely commercial breaks during certain programming types, for example. A TTL may refer to a counter or timestamp which may refer to how long the shadow impression and associated advertisement may be cached. When the counter or timestamp reaches an expiration (e.g., the counter has decremented to zero or the time has passed), the device may determine that the TTL has expired.

At block 504, the device may expunge the shadow impression. Expunging may include removing or replacing the URL and/or the associated page or file. The expunging may including clearing an advertisement from a cache. When the expiration time (e.g., TTL) for a shadow impression expires, the device may expunge the shadow impression and any record caused by the shadow impression indicating playback of content associated with the shadow impression. For example, if a playback count of an advertisement is two, and one of the two playback counts is based on the shadow impression, when the shadow impression time expires, the count may decrement to one. At expiration of the TTL, the device may delete the shadow impression or replace it with another shadow impression at a different time.

At block 506, the device may determine whether using the first advertisement would exceed a playback limit/threshold, such as a frequency cap, budget limit, or other limit. After expunging the shadow impression, the metrics used to track a playback limit/threshold may be updated. If an actual impression for the first advertisement is received before expiration of the TTL, for example, the actual impression may replace the shadow impression. If no actual impression for the first advertisement is received before expiration of the TTL, the shadow impression may be expunged, and the playback metrics may be updated accordingly. For example, if the playback count of the first advertisement indicates, after the expunging of the shadow impression, that the first advertisement may be cached/played without violated or exceeding the budget limit or frequency cap, the device may proceed to block 508. If the device determines that the playback count for the first advertisement indicates that caching/playing the first advertisement may exceed a frequency cap or budget limit, the device may proceed to block 512.

At block 508, the device may cache the first advertisement, allowing the first advertisement to be included in a next pod. The first advertisement may be assigned a record with a shadow impression having an expiration time. The record may indicate that, before expiration the expiration time, the first advertisement may be considered cached and likely played. At block 510, the device may determine and send an advertising pod including the first advertisement. For example, if at block 506 the device determines that including the first advertisement in the pod would not result in exceeding a playback limitation for the first advertisement, the first advertisement may be included in the pod. If the first advertisement is included in the pod, then another shadow impression may be assigned to the first advertisement with another expiration time indicating that, before expiration of the expiration time (e.g., TTL), the first advertisement may be considered as having been presented by a user device. The shadow impression may increase a playback count associated with how often the first advertisement has been played over a period of time. Even if the device determines at block 506 that the first advertisement is eligible for a pod, the device may not include the first advertisement in the next pod because there may be other eligible advertisements and/or the first advertisement may not meet the criteria indicated by a received request for an advertisement pod.

At block 512, the device may cached one or more other advertisements, but not the first advertisement because caching the advertisement may result in a violation of including that advertisement in a pod. For example, if at block 506 the device determines that including the first advertisement in the pod would result in exceeding a playback limitation for the first advertisement, the first advertisement may be excluded from the pod and therefore may not be cached. At block 514, the device may generate and send an advertisement pod using cached ads, excluding the first advertisement. The advertisement pod may be generated and sent using advertisements fetched and cached according to a request provided by a user device for the advertisement pod. The advertisements included in the pod may be assigned respective shadow impressions used to count the included advertisements as played until expiration of an associated expiration time (e.g., TTL).

Figure 6:
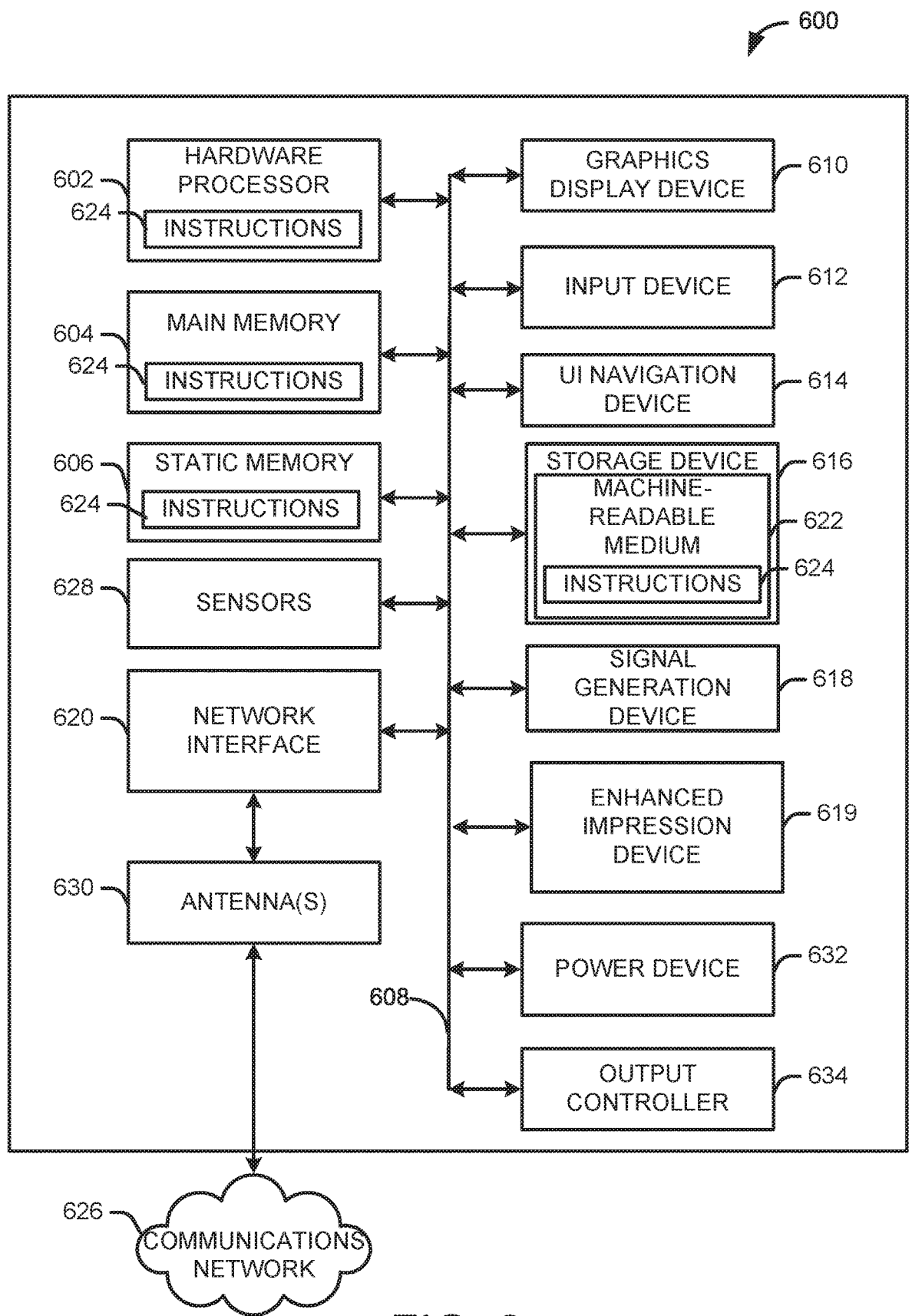
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 102 102 of FIG. 1, the streaming video provider 104 of FIG. 1, the user devices 202 of FIG. 2, the streaming video provider 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a enhanced impression device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced impression device 619 may carry out or perform any of the operations and processes (e.g., process 300 of FIG. 3, process 400 of FIG. 4, process 500 of FIG. 5) described and shown above.

The enhanced impression device 619 may pre-fetch a group of streaming video advertisements to be provided upon request from streaming devices (e.g., user devices 202 of FIG. 2) to facilitate the delivery of streaming content to the devices during a commercial break from a live-streamed program. The enhanced impression device 619 may cache advertisements which are determined to be available based on impression data. The cached advertisements may be made available to an advertisement pod. The enhanced impression device 619 may cache a new group of streaming video advertisements to provide at the next request for advertisements before receiving an impression associated with a previously provided advertisement. Without an indication that previously provided streaming video content was presented, the enhanced impression device 619 may cache and provide the same content when doing so may be undesirable and may result in an inefficient use of computer resources. Using impression data, the enhanced impression device 619 may determine which advertisements are available for a pod, and may cache advertisements accordingly. When an advertisement is retrieved and cached, the enhanced impression device 619 may assign a shadow impression with an expiration time to an advertisement.

Because a pre-fetch request for next advertisements may occur before impression events are received indicating that previously sent streaming video advertisements were played (e.g., upon serving a pod, the enhanced impression device 619 may request the next set of advertisements to be cached), the enhanced impression device 619 may not be able to account for the impressions when generating the next advertisement pod. As a result, the streaming video provider may over-serve advertisements, which may violate rules for budgeting and frequency capping, among others, associated with an advertisement or advertisement campaign.

When the enhanced impression device 619 sends an advertisement pod with multiple streaming video advertisements and then receives a subsequent request for the next advertisement pod, the enhanced impression device 619 may not receive and/or process an indication from a video player whether the streaming video advertisements in the previously presented advertisement pod have been played. The enhanced impression device 619 may use cached video advertisements to generate a new advertisement pod, but without knowing whether content was recently played, the same content may be provided in an advertisement pod. To better control the caching and delivery of video advertisements, the enhanced impression device 619 may rely on a "shadow" impression.

In one or more embodiments, a shadow impression may be used to enhance the storage and delivery of streaming video content such as streaming video advertisements. When the enhanced impression device 619 pre-fetches and caches advertisements for inclusion in a subsequent pod, the enhanced impression device 619 may inject a shadow impression for any advertisement. During an expiration time period, the enhanced impression device 619 may consider an advertisement as having been cached/presented for the purposes of tracking an advertising budget and/or frequency (e.g., the shadow impression may indicate temporarily that the advertisement has been presented). If an actual impression for an advertisement is received before expiration of the time period, the shadow impression may be expunged (e.g., deleted/removed) and/or replaced with the actual impression. If an actual impression for the advertisement is not received before expiration of the time period, the shadow impression may be expunged. In such a manner, the shadow impression may affect the counted number of times an advertisement has been played over a given time even if the enhanced impression device 619 has not yet processed an actual impression confirming the playback.

The enhanced impression device 619 may facilitate the stitching of streaming video advertisements may in different ways. One example may include server-side advertisement stitching. Another example may include client-side injection of advertisements. Server-side ad stitching may refer to publishers stitching video and advertisement content together before providing the content and advertisements for web browser playback. Client-side advertisements may refer to client devices receiving video content and advertisements and combining them for playback. In one more embodiments, enhancements provided by shadow impressions may work with both types of streaming video by including the shadow impression data with any advertisement so that the proper playback metrics are tracked. The enhanced impression device 619 may provide streaming video advertisements directly to client devices or may provide streaming video advertisements to one or more other devices to stich the advertisements with live content.

In one or more embodiments, if the enhanced impression device 619 receives impression data indicating that a streaming video advertisement has been played, the enhanced impression device 619 may use that data to determine whether or when to again provide the streaming video advertisement. The impression data may be received and processed before expiration of the time associated with a shadow impression, in which case the shadow impression may expire. If the shadow impression time (e.g., TTL) expires before receipt of an impression indication that the streaming video advertisement was played, the shadow impression may expire. Before expiration of the shadow impression time, the enhanced impression device 619 may assume that the streaming video advertisement has been cached/played and may be unavailable during that time for subsequent playback at a given device (e.g., if the shadow impression results in a determination that the advertisement has been played enough times when compared to a frequency cap or advertisement budget). Once the shadow impression time has expired, if an actual impression has not been processed indicating that the streaming video advertisement was played, the enhanced impression device 619 may determine that the streaming video advertisement was not played, which may indicate that the streaming video advertisement is again available for a subsequent advertisement pod.

In one or more embodiments, while a streaming video advertisement may have a URL associated with an actual impression, during the shadow impression time the streaming video advertisement also may have a URL associated with the shadow impression. Therefore, two files/pages may be associated with the use of the streaming video advertisement before the shadow impression time expires. The enhanced impression device 619 may use either the URL of the actual impression or the URL of the shadow impression to determine whether a streaming video advertisement has been played. The URL of the actual impression may have a different endpoint than the URL of the shadow impression.

In one or more embodiments, the enhanced impression device 619 may be able to differentiate between the actual impression URL and the shadow impression URL, thereby allowing the streaming video provider to determine at a given time when the streaming video advertisement was last played, while also using such information to determine the impact on budgeting and playback frequency for the streaming video advertisement. In particular, the enhanced impression device 619 may use the actual impression URL to determine that the streaming video advertisement was played and the subsequent impact on budget and frequency, and the enhanced impression device 619 may use the shadow impression URL to determine that the streaming video advertisement was played without using the data to account for billing and frequency. After expiration of a shadow impression time, the shadow impression may expire (e.g., be deleted/removed). Expired shadow impressions may be removed/expunged at any given time, or may be replaced by other shadow impressions.

In one or more embodiments, the shadow expiration time may be set by the enhanced impression device 619 or received from a broadcaster. The TTL may be included with (e.g., embedded in) or in addition to streaming video data. For example, TTL may be included in a header of a frame including the video data. The TTL or other expiration time may be determined based on the broadcast type (e.g., the type of content, the type of devices used to play the content, etc.). A shadow event may include the TTL, which advertisement was played, which campaign is associated with an advertisement, the cost of the advertisement and/or campaign, and other relevant metrics.

In one or more embodiments, streaming video advertisements may be cached and stored based on the individual devices used for playback (e.g., client devices). For example, advertisements for different devices may be stored in the same cache or in different caches, but the groups of advertisements (e.g., advertisement pods) may be device-specific. The enhanced impression device 619 may determine which streaming video advertisements have been played by which devices, and may generate advertisement pods based on which advertisements are available for playback at a given time for a particular device based on budget, frequency, and other relevant campaign data associated with impressions.

It is understood that the above are only a subset of what the enhanced impression device 619 may be configured to perform and that other functions included throughout this disclosure may also be performed by the enhanced impression device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    sending, by at least one processor, a first group of streaming video advertisements, the first group of streaming video advertisements including a first advertisement, wherein the first advertisement is associated with a first shadow impression, wherein the first shadow impression indicates, until expiration of a first expiration time, that the first advertisement was cached;
    determining, before receiving an impression associated with the first advertisement, a first number of total impressions associated with the first advertisement, wherein the first number of total impressions includes the first shadow impression;
    determining that the first number of total impressions exceeds a first playback threshold;
    determining not to include the first advertisement in a second group of streaming video advertisements;
    determining a second advertisement, wherein the second advertisement is associated with a second shadow impression, wherein the second shadow impression indicates, until expiration of a second expiration time, that the second advertisement was cached;
    determining, before receiving an impression associated with the second advertisement, a second number of total impressions associated with the second advertisement;
    determining that the second number of total impressions fails to exceed a second playback threshold;

determining to include the second advertisement in the second group of streaming video advertisements;

receiving a request, the request associated with determining the second group of streaming video advertisements;

caching the second group of streaming video advertisements, the second group of streaming video advertisements including the second advertisement; and sending the second group of streaming video advertisements.

2. The method of claim 1, further comprising:
determining a number of impressions; and
determining a number of shadow impressions, wherein the number of shadow impressions includes the first shadow impression, wherein the first number of total impressions includes the number of impressions and the number of shadow impressions.

3. The method of claim 1, further comprising:
receiving, before expiration of the first expiration time, an impression, wherein the impression indicates that the first advertisement was presented; and
sending an indication to expunge the first shadow impression.

4. The method of claim 1, wherein the request is a first request, further comprising:
determining that the first expiration time has expired;
determining that an impression associated with the first advertisement was not received before expiration of the first expiration time, wherein the impression indicates presentation of the first advertisement;
determining a third shadow impression associated with the first advertisement, wherein the third shadow impression indicates, until expiration of a third expiration time, that the first advertisement was cached;
caching a third group of streaming video advertisements, the third group of streaming video advertisements including the first advertisement;
receiving a second request, the second request associated with determining the third group of streaming video advertisements; and
sending the third group of streaming video advertisements.

5. A method, comprising:
determining, by at least one processor, a first advertisement, wherein the first advertisement is associated with a first number of impressions;
determining the first number of impressions, wherein the first number of impressions includes a first number of shadow impressions and a first impression for the first advertisement, wherein a first shadow impression of the first number of shadow impressions is associated with a first uniform resource locator, wherein the first uniform resource locator expires upon expiration of a first time, wherein the first impression is associated with a second uniform resource locator, wherein the second uniform resource locator does not expire upon the expiration of the first time;
determining not to include the first advertisement in a group of streaming video advertisements based on the first number of impressions exceeding a first playback threshold;
receiving a request, the request associated with determining the group of streaming video advertisements; and
sending the group of streaming video advertisements.

6. The method of claim 5, wherein the request is received before the expiration of the first time, wherein the first shadow impression indicates, until expiration of the first time, that the first advertisement was viewed.

7. The method of claim 5, further comprising:
determining a second advertisement, wherein the second advertisement is associated with a second number of impressions, wherein the second number of impressions includes a second number of shadow impressions; and
determining to include the second advertisement in the group of streaming video advertisements based on the second number of impressions exceeding a second playback threshold, wherein the group of streaming video advertisements includes the second advertisement.

8. The method of claim 5, wherein the group of streaming video advertisements is a first group of streaming video advertisements, and wherein determining the first number of shadow impressions occurs before the expiration of the first time, further comprising:
determining, after the expiration of the first time, the first number of shadow impressions;
determining to include the first advertisement in a second group of streaming video advertisements based on the first number of impressions failing to exceed the first playback threshold; and
sending, before receiving the request, the second group of streaming video advertisements, the second group of streaming video advertisements including the first advertisement.

9. The method of claim 5, further comprising receiving, before the expiration of the first time, a second impression, wherein the second impression indicates that the first advertisement was presented.

10. The method of claim 9, wherein the request is a first request, wherein the group of streaming video advertisements is a first group of streaming video advertisements, further comprising:
determining a second number of impressions associated with the first advertisement, the second number of impressions including the second impression;
determining not to include the first advertisement in a second group of streaming video advertisements based on the second number of impressions exceeding the first playback threshold;
receiving a second request, the second request associated with determining the second group of streaming video advertisements; and
sending the second group of streaming video advertisements.

11. The method of claim 5, further comprising:
determining that the first time has expired;
determining that the first advertisement was not presented before expiration of the first time; and
sending an indication to expunge the first shadow impression from the first number of impressions, wherein the first number of impressions excludes the first shadow impression after expiration of the first time.

12. The method of claim 11, wherein the request is a first request, wherein the group of streaming video advertisements is a first group of streaming video advertisements, further comprising:
generating a second shadow impression associated with the first advertisement, wherein the second shadow impression indicates, until expiration of a second time, that the first advertisement was cached;
determining a second number of impressions, wherein the second number of impressions includes the second shadow impression before expiration of the second time, and wherein the second number of impressions excludes the second shadow impression after expiration of the second time;

determining to include the first advertisement in a second group of streaming video advertisements based on the second number of impressions failing to exceed the first playback threshold;

receiving a second request, the second request associated with determining the second group of streaming video advertisements; and sending the second group of streaming video advertisements.

13. The method of claim 5, determining the group of streaming video advertisements is based on a device at which the first advertisement is to be presented.

14. The method of claim 5, wherein the first time is based on a broadcast type, wherein the broadcast type is associated with presentation of the group of streaming video advertisements.

15. The method of claim 5, wherein the first time is associated with a time-to-live.

16. A device, comprising memory coupled to at least one processor, the at least one processor configured to:

determine a first advertisement, wherein the first advertisement is associated with a first number of impressions;

determining the first number of impressions, wherein the first number of impressions includes a first number of shadow impressions and a first impression for the first advertisement, wherein a first shadow impression of the first number of shadow impressions is associated with a first uniform resource locator, wherein the first uniform resource locator expires upon expiration of a first time, wherein the first impression is associated with a second uniform resource locator, wherein the second uniform resource locator does not expire upon the expiration of the first time;

determine not to include the first advertisement in a group of streaming video advertisements based on the first number of impressions exceeding a first playback threshold;

receive a request, the request associated with determining the group of streaming video advertisements for streaming video at another device; and send the group of streaming video advertisements.

17. The device of claim 16, wherein the request is received before the expiration of the first time, wherein the first shadow impression indicates, until expiration of the first time, that the first advertisement was viewed.

18. The device of claim 16, wherein the at least one processor is further configured to:

determine a second advertisement, wherein the second advertisement is associated with a second number of impressions, wherein the second number of impressions includes a second number of shadow impressions; and determine to include the second advertisement in the group of streaming video advertisements based on the second number of impressions exceeding a second playback threshold, wherein the group of streaming video advertisements includes the second advertisement.

19. The device of claim 16, wherein the at least one processor is further configured to:

determine that the first time has expired;

determine that the first advertisement was not presented before expiration of the first time; and send an indication to expunge the first shadow impression from the first number of impressions, wherein the first number of impressions excludes the first shadow impression after expiration of the first time.

20. The device of claim 16, wherein the at least one processor is further configured to:

receive, before the expiration of the first time, a second impression, wherein the second impression indicates that the first advertisement was presented.

* * * * *